(12) United States Patent
Börchers et al.

(10) Patent No.: US 11,639,709 B2
(45) Date of Patent: May 2, 2023

(54) WIND TURBINE ROTOR BLADE AND METHOD FOR ASSEMBLING A WIND TURBINE ROTOR BLADE

(71) Applicant: Wobben Properties GmbH, Aurich (DE)

(72) Inventors: Rasmus Börchers, Bremen (DE); Renato Ciapanna, Düsseldorf (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/948,954

(22) Filed: Sep. 20, 2022

(65) Prior Publication Data
US 2023/0086143 A1    Mar. 23, 2023

(30) Foreign Application Priority Data
Sep. 23, 2021  (EP) ..................................... 21198438

(51) Int. Cl.
*F03D 1/06*    (2006.01)
(52) U.S. Cl.
CPC ........ *F03D 1/0675* (2013.01); *F05B 2230/60* (2013.01); *F05B 2240/302* (2013.01); *F05B 2260/301* (2013.01)
(58) Field of Classification Search
CPC ............... F03D 1/0675; F05B 2230/60; F05B 2240/302; F05B 2260/301
See application file for complete search history.

(56) References Cited

U.S. PATENT DOCUMENTS 9,797,369 B2 * 10/2017 Kratmann ............. F03D 1/0633
10,077,757 B2 * 9/2018 Kannenberg .......... F03D 1/0658
(Continued)

FOREIGN PATENT DOCUMENTS

| CN | 102878183 A | 1/2013 |
|---|---|---|
| CN | 105464898 A | 4/2016 |

(Continued)

*Primary Examiner* — Eldon T Brockman
(74) *Attorney, Agent, or Firm* — Seed Intellectual Property Law Group LLP

(57) ABSTRACT

Provided is a wind turbine rotor blade with a longitudinal direction, at least one first rotor blade section with a first front side and one second rotor blade section with a second front side and a separation point between the first and second rotor blade sections. The first and second front sides abut against each other at the separation point. The first front side has a plurality of first recesses, and the second front side has a plurality of second recesses. Further provided is a fastening unit, which is designed to fasten the first and second rotor blade sections to each other at the separation point. The fastening unit has a plurality of first inserts made out of metal, which are arranged in the first recesses, and a plurality of second inserts made out of metal, which are arranged in the second recesses. The first inserts each have a first end and a second end. The second inserts each have a first end and a second end. The first ends of the first and second inserts are each arranged at the separation point. The fastening unit has a plurality of clamping units, which are suitable for bracing the first and second inserts against each other, wherein the respective first ends of the first and second inserts abut against each another and are braced against each other in the braced state.

9 Claims, 6 Drawing Sheets

(56) References Cited

U.S. PATENT DOCUMENTS

| | | | | |
|---|---|---|---|---|
| 10,578,077 B2* | 3/2020 | Hoffmann | ............ | F03D 1/0675 |
| 10,767,624 B2* | 9/2020 | Monreal Lesmes | ...... | F01D 1/06 |
| 10,865,767 B2* | 12/2020 | Rubner | ................ | F16B 11/006 |
| 2005/0106029 A1* | 5/2005 | Kildegaard | ............ | B29C 70/86 |
| | | | | 416/229 R |
| 2012/0141287 A1* | 6/2012 | Hynum | ................ | F03D 1/0675 |
| | | | | 416/235 |
| 2014/0334934 A1* | 11/2014 | Kannenberg | .......... | F03D 1/0675 |
| | | | | 416/217 |
| 2015/0292477 A1* | 10/2015 | Kratmann | ............ | F03D 1/0675 |
| | | | | 416/232 |
| 2019/0264650 A1* | 8/2019 | Rubner | ................ | F16B 11/006 |
| 2022/0228554 A1* | 7/2022 | Festner | ................ | F03D 1/0683 |
| 2022/0260051 A1* | 8/2022 | Hedges | ................ | F03D 1/0675 |

FOREIGN PATENT DOCUMENTS

| | | | |
|---|---|---|---|
| EP | 2708735 | B1 | 8/2016 |
| EP | 1815137 | B1 | 9/2018 |
| EP | 3581790 | A1 | 12/2019 |
| EP | 3129644 | B1 | 11/2020 |
| WO | 2020119874 | A1 | 6/2020 |

\* cited by examiner

WIND TURBINE ROTOR BLADE AND METHOD FOR ASSEMBLING A WIND TURBINE ROTOR BLADE

BACKGROUND

Technical Field

The present invention relates to a wind turbine rotor blade and a method for assembling a wind turbine rotor blade.

Description of the Related Art

Since the length of the modern rotor blades of wind turbines is getting bigger and bigger, a switch has partially been made to dividing rotor blades in a longitudinal direction, so that a rotor blade consists of at least two rotor blade parts, which can later be assembled with each other. Since the rotor blades of a wind turbine are exposed to very high static and dynamic loads during operation, the connection point between two rotor blade parts must be designed accordingly.

EP 1 815 137 shows a rotor blade of a wind turbine, which is divided in the longitudinal direction, so that a first and second rotor blade section is provided. Provided between the first and second section is a connecting piece with a first and second flange for coupling with the respective first and second part. As a consequence, the two rotor blade sections are fastened at opposite ends of the connecting piece by means of screws and nuts.

EP 2 708 735 B1 shows a longitudinally divided wind turbine rotor blade with an intermediate part that has two transverse end partitions. Bolts and screws are used to fasten the parts of the rotor blades to the intermediate part.

BRIEF SUMMARY

Provided is a multipart wind turbine rotor blade with an improved fastening option between the sections of the rotor blade.

Therefore provided is a wind turbine rotor blade with a longitudinal direction, at least one first rotor blade section with a first front side and one second rotor blade section with a second front side and a separation point between the first and second rotor blade section. The first and second front sides abut against each other at the separation point. The first front side has a plurality of first recesses, and the second front side has a plurality of second recesses. Further provided is a fastening unit, which is designed to fasten the first and second rotor blade sections with each other at the separation point. The fastening unit has a plurality of first inserts made out of metal, which are arranged in the first recesses, and a plurality of second inserts made out of metal, which are arranged in the second recesses. The first inserts each have a first end and a second end. The second inserts each have a first end and a second end. The first ends of the first and second inserts are each arranged at the separation point. The fastening unit has a plurality of clamping units, which are suitable for bracing the first and second inserts against each other, wherein the respective first ends of the first and second inserts abut against each other and are braced against each other in the braced state.

Provided is a wind turbine rotor blade with at least one first and second section, as well as at least one fastening unit (or fastener) at a separation point between the at least one first and second section. The rotor blade can essentially be made out of laminate with a glass fiber or carbon fiber-reinforced plastic. The first section of the rotor blade has a first fastening interface on a first front side of the first section. The second section of the rotor blade has a second fastening interface on a second front side of the second section. The first and second fastening interfaces can be coupled with each other, and can comprise the separation point. In the area of the fastening interface, the rotor blade has a laminate, e.g., with glass fiber-reinforced plastic or carbon fiber-reinforced plastic. The first and second rotor blade sections have a first and second insert, each with a first and second end. The second ends of the first and second insert are located in the laminate of the rotor blade. The first ends are provided in the area of the separation point between the first and second sections of the rotor blade, so that they lie on top of or against each other when the first and second rotor blade parts are fastened to each other and pretensioned by means of the fastening unit.

A bracing by means of the clamping unit (or clamp) can be achieved using a rod and a nut, for example, wherein one end of the rod is provided in the first or second insert, and the second end of the rod is coupled by means of a nut in or on the second or first insert, so that the two parts of the rotor blade can be fastened with or to each other by means of the clamping unit (the threaded rod and screw). The clamping unit (e.g., the rod) can optionally be coupled to the first and second insert at both ends with nuts.

The first and second inserts are made out of metal. The connection between the first and second rotor blade parts by means of the fastening unit is advantageous, because the respective first ends of the inserts are made out of metal, so that the interface between the first and second rotor blade parts can comprise a metal interface (metal-on-metal). This interface can be pretensioned accordingly during assembly. It is then optionally possible to dispense with maintenance of this interface. Such an interface can thus be given a maintenance-free design.

In prior art, the separation points between the two rotor blade sections at least partially have an interface between the laminate and a metal flange. This can lead to an impaired connection between the first and second rotor blade parts, so that this connection must be retensioned. This is avoided by virtue of the fact that the interface between the first and second rotor blade parts can comprise a metal-on-metal interface.

The first and second inserts each have a recess, e.g., in the form of an at least partially continuous borehole. A thread or threaded insert can optionally be provided in a first insert. A continuous borehole can optionally be provided on the first and/or second insert, through which a clamping unit can be guided, e.g., in the form of a rod or a bolt. The clamping unit can optionally be pretensioned by means of a nut. The rod can optionally be coupled at both ends with nuts on the first and second insert.

A recess can be provided in the area of the second rotor blade part (which can comprise an external part of the rotor blade), e.g., in the form of a borehole for each first insert. A plurality of first inserts is preferably provided, which extend along the periphery of the rotor blade parts. A plurality of recesses or boreholes for receiving a respective second insert is likewise provided in the second rotor blade part (for example, a rotor blade internal part).

The connection between two rotor blade sections permits a cost-effective and lower-maintenance solution for the connection. The divided rotor blades allow transport costs to be lowered. It is then further also possible to transport rotor blades to difficultly accessible locations. The connection can further permit an increase in the permissible mechanical load. In particular, the connection can be used to achieve a maintenance-free connection between two rotor blade sections. As a consequence, a multipart rotor blade having a separation point in the area of the external blade section could also be achieved. This would not be possible in a connection that was not maintenance-free, since such a connection point would not be accessible.

A pretensioning of the clamping units (for example bolts or threaded bolts) can be achieved by a hydraulic piston or punch. For example, this punch can be introduced into the oblong holes of the first rotor blade section.

The first and second inserts can be provided in one or two rows (with a continuous cross section) at the second ends of the rotor blade sections.

Several oblong holes can be provided in the first and/or second rotor blade section, in particular in the area of the first and second front sides. The oblong holes make it possible to brace or pretension the fastening units. The oblong holes can optionally be alternatingly provided in the first and second rotor blade sections. This is advantageous, since the oblong holes can thereby be arranged at less of a distance to each other. The load that can be transferred by means of the separation point thereby also increases. This can result in a situation where the weight of the separation point can be reduced.

The connection makes it possible to reduce the weight of the rotor blade in particular in the area of the separation point.

Additional configurations of the invention are the subject of the subclaims.

BRIEF DESCRIPTION OF THE SEVERAL VIEWS OF THE DRAWINGS

Advantages and exemplary embodiments of the invention will be explained in more detail below with reference to the drawing.

DETAILED DESCRIPTION

Figure 1:
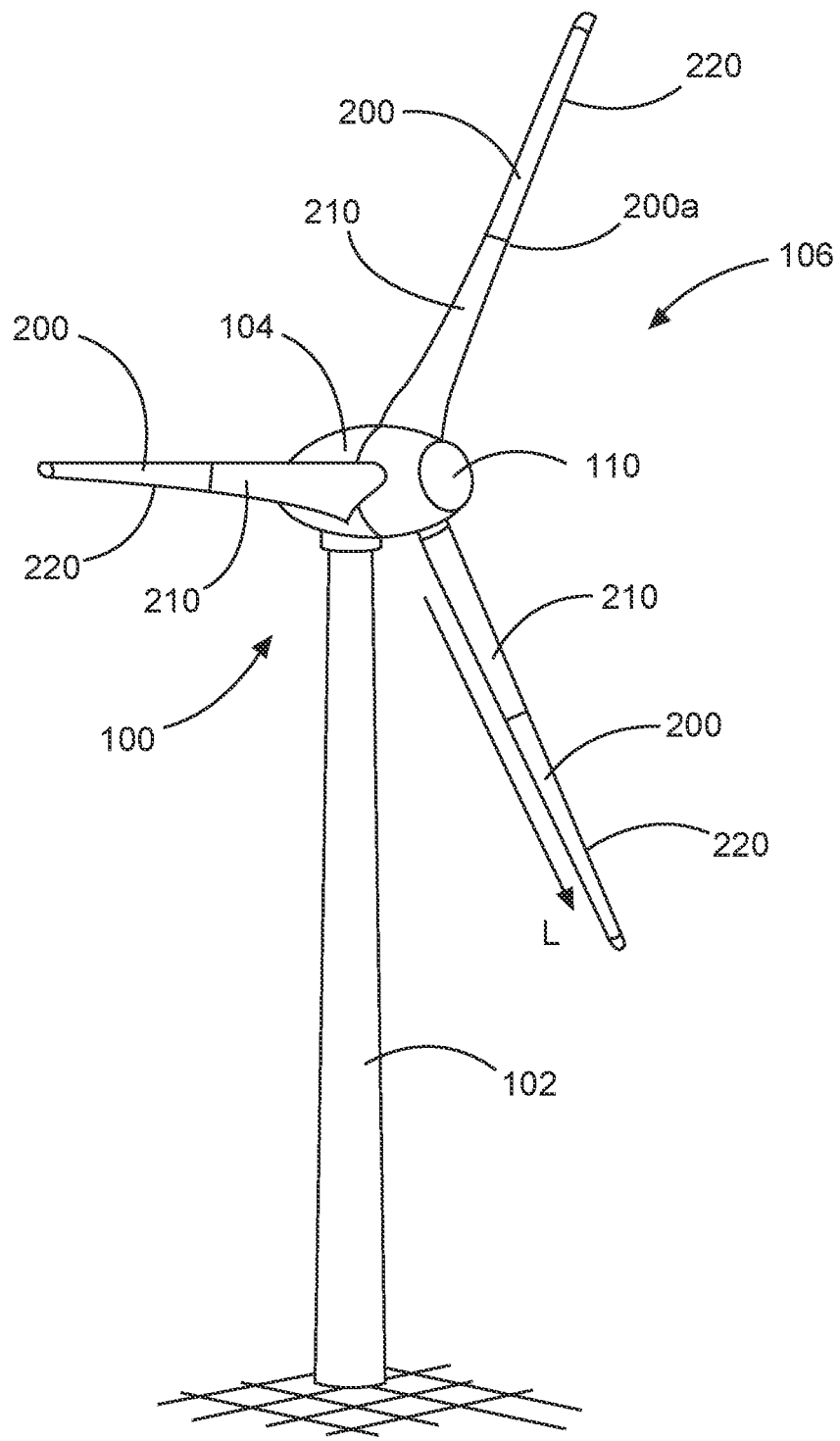
FIG. 1 shows a schematic view of a wind turbine according to an exemplary embodiment of the invention.

FIG. 1 shows a schematic view of a wind turbine according to the invention. The wind turbine 100 has a tower 102 and a nacelle 104 on the tower 102. An aerodynamic rotor 106 with three rotor blades 200 and one spinner 110 is provided on the nacelle 104. During operation of the wind turbine, the wind imparts a rotational motion to the aerodynamic rotor 106, which thus also rotates a rotor or runner of a generator that is directly or indirectly coupled with the aerodynamic rotor 106. The electrical generator is arranged in the nacelle 104, and generates electrical energy. The pitch angles of the rotor blades 200 can be changed by pitch motors on the rotor blade roots of the respective rotor blades 200. The rotor blades 200 each have a longitudinal direction L.

According to a first exemplary embodiment, the rotor blades 200 have a two-part design in at least the longitudinal direction, so that they each have a first and second rotor blade section 210, 220 with a separation point 200a in between. The first rotor blade section 210 comprises an inner rotor blade section, and has a rotor blade root at its first end and a front side at its second end. The second rotor blade section 220 has a rotor blade tip at its first end, and a front side at its second end. The first and second rotor blade sections 210, 220 can be coupled or connected with each other at the separation point 200a.

For example, the rotor blades 200 can be assembled out of two half-shells. The rotor blades 200 can have a sheath comprised of a laminate and optionally reinforcing or stiffening webs between the first and second half-shell. For example, the rotor blades 200 can thus be hollow in design. Depending on the size of the rotor blade, it can be possible for maintenance personnel to be present in the interior of the rotor blade to check a separation point or connection point between two rotor blade sections.

Figure 2:
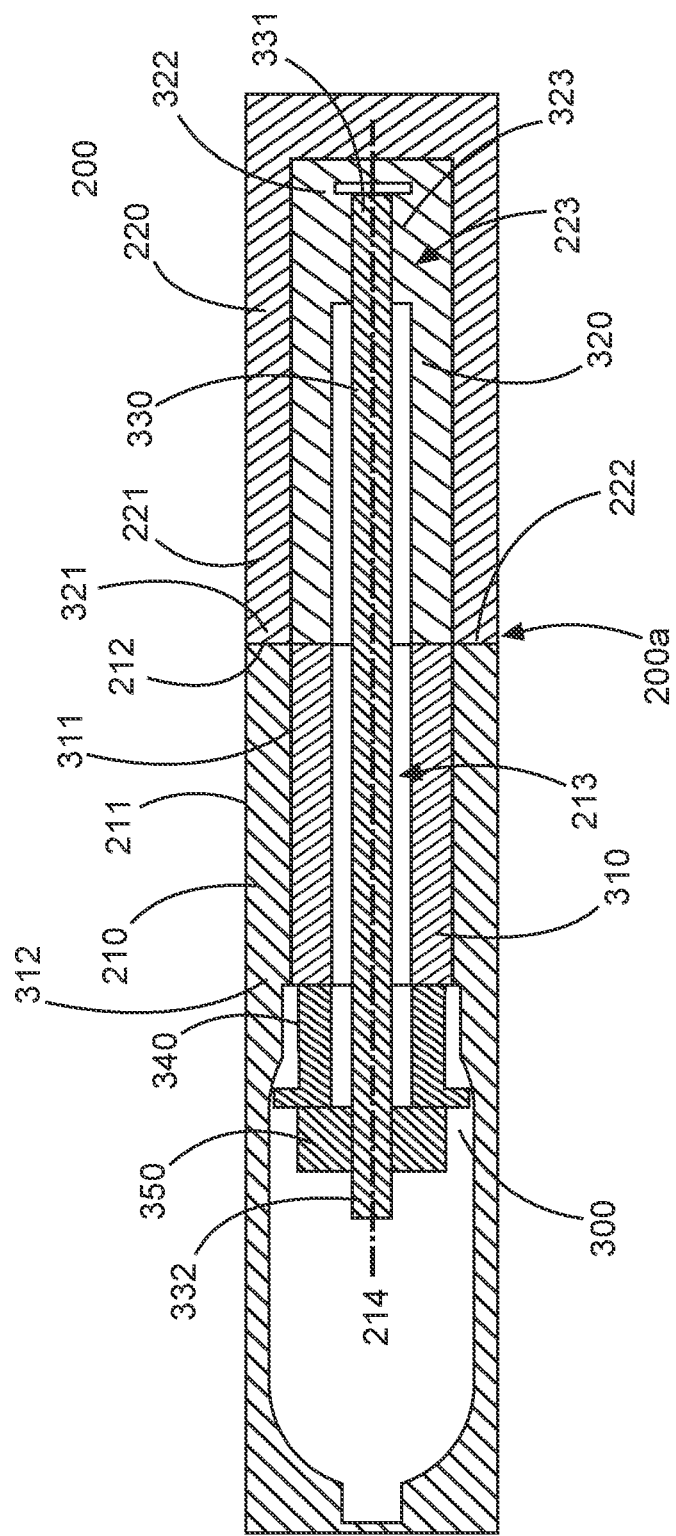
FIG. 2 shows a schematic cross section of a separation point between a first and second rotor blade part.

FIG. 2 shows a schematic cross section of a separation point between a first and second rotor blade part. In particular, FIG. 2 shows the interface or separation point 200a between the first and second rotor blade sections 210, 220. The first and second rotor blade sections 210, 220 have a first and second laminate 211, 221, which is typical for rotor blades of a wind turbine. For example, this first and second laminate 211, 221 can comprise glass fiber-reinforced plastic or carbon fiber-reinforced plastic. The first rotor blade section 210 has a first front side 212. The second rotor blade section 220 has a second front side 222. The first and second front sides 212, 222 abut against each other at the separation point 200a. As a consequence, the first and second front sides form an interface between the rotor blade sections. The first and second rotor blade sections 210, 220 each have a plurality of first or second recesses or boreholes 213, 223. These first or second recesses or boreholes 213, 223 can be arranged along the circumference of the first and second rotor blade sections 210, 220. In addition thereto, a plurality of recesses, e.g., in the form of first oblong holes 214, can be provided in the first rotor blade section 210, which is coupled with at least one of the recesses 213. Alternatively thereto, the oblong hole 214 can also be provided in the second rotor blade section 220. According to an additional aspect, oblong holes can alternatingly be provided in the first and second rotor blade sections. In the circumferential direction, it is thus possible to alternatingly provide an oblong hole in the first rotor blade section 210, and an oblong hole 214 in the second rotor blade section 220.

A fastening unit 300 is provided in order to fasten the first and second rotor blade sections 210, 220 with or to each other. The fastening unit 300 has first and second inserts 310, 320.

The second inserts 320 are placed in the recesses or boreholes 223 of the second rotor blade part 220. The first inserts 310 are placed in the recesses or boreholes 213 in the first rotor blade part 210. The inserts 310, 320 are each made out of metal.

The fastening unit 300 has first inserts 310 in the recesses or boreholes 213 of the first rotor blade section 210, as well as second inserts 320 in the recesses or boreholes 223 of the second rotor blade section 220. Additionally provided is a clamping unit, e.g., in the form of bolts, rods or threaded rods 330 for the fastening unit 300, which can brace the first and second inserts 310, 320 with or against each other. The first end 331 of the bolt 330 can here be fastened in a first thread 323, which is provided in the area of the second insert 320 facing away from the front surface. For example, a second end 332 can be fastened to a first insert 310 by means of a nut 350. An adapter 340 can optionally be provided between the nut 350 and the first inserts 310. In an aspect, the fastening unit 300 can also be provided mirror-inverted in the first and second rotor blade sections 210, 220.

The first inserts 310 have a first and second end 311, 312. The second inserts 320 each have a first and a second end 321, 322. The respective first ends 311, 321 of the first and second inserts 310, 320 abut against each other at the separation point 200a.

While the second recesses or boreholes 223 can be blind holes, the first recesses or boreholes 213 can empty into a recess, e.g., in the form of an oblong hole 214. The longitudinal direction of the oblong hole 214 extends in an axial direction, and the borehole in a radial direction. In the assembled state, the first ends 311, 321 of the first and second inserts 310, 320 abut against each other, and can be braced by means of the clamping unit, so that a metal-on-metal interface can be present. The boreholes 324 can be designed as blind holes or as through holes (with a nut on the rear side).

Figure 3:
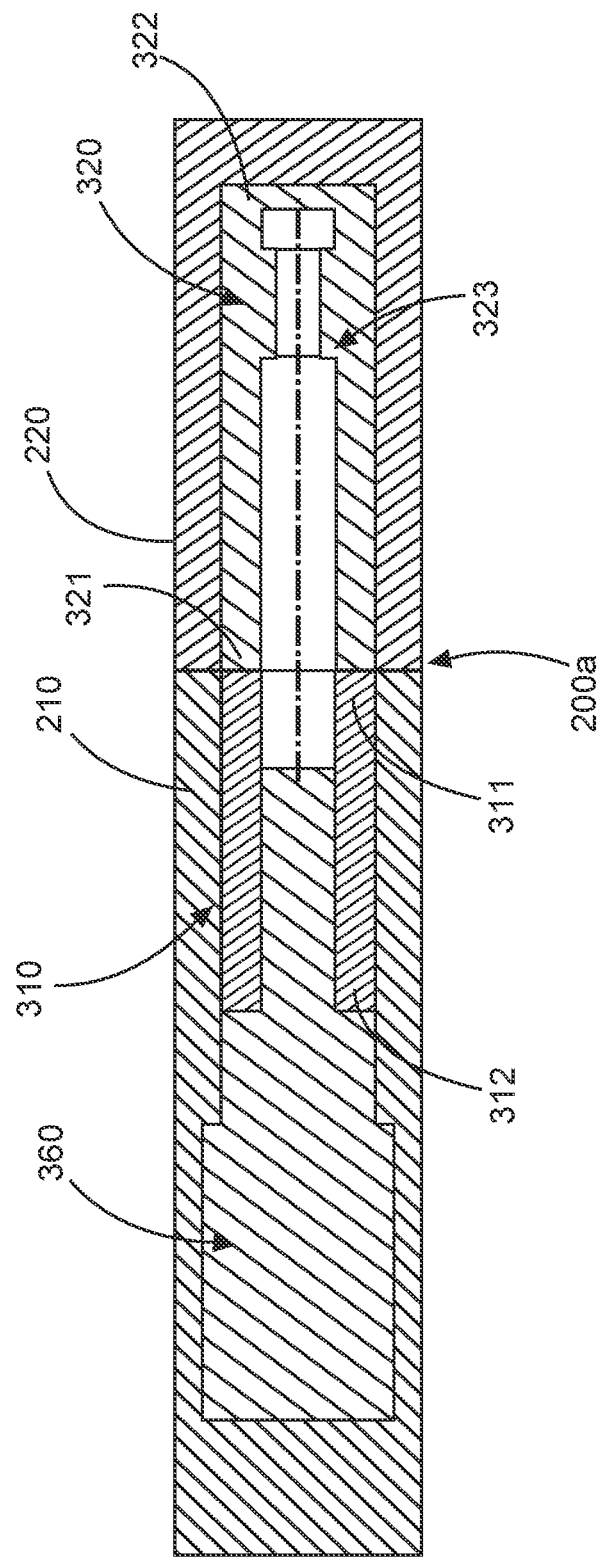
FIG. 3 shows a further cross section of a separation point between two rotor blade parts.

FIG. 3 shows another cross section of a separation point between two rotor blade parts. The structural design on FIG. 3 essentially corresponds to the structural design on FIG. 2. As a consequence, a rotor blade 200 has a first and a second rotor blade section 210, 220. A plurality of first boreholes 213 is provided in the first rotor blade section 210, and a plurality of second boreholes 223 is provided in the second rotor blade section 220. First inserts 310 are provided in the first boreholes 213, and second inserts 320 in the second boreholes 223. The second insert 320 according to FIG. 3 essentially corresponds to the second insert 320 on FIG. 2. Only the thread 323 is fastened at a different position.

The structural design of the first inserts 310 according to FIG. 3 essentially corresponds to the structural design of the first inserts 310 according to FIG. 2.

Additionally thereto, an insert, e.g., made out of silicone 360, can be provided, for example which can be used to seal the oblong hole 214 and/or the borehole 213 during manufacture. Alternatively or additionally thereto, an insert, e.g., made out of silicone, can also be used for sealing the second recess 223 and/or the second oblong holes 314.

Figure 4:
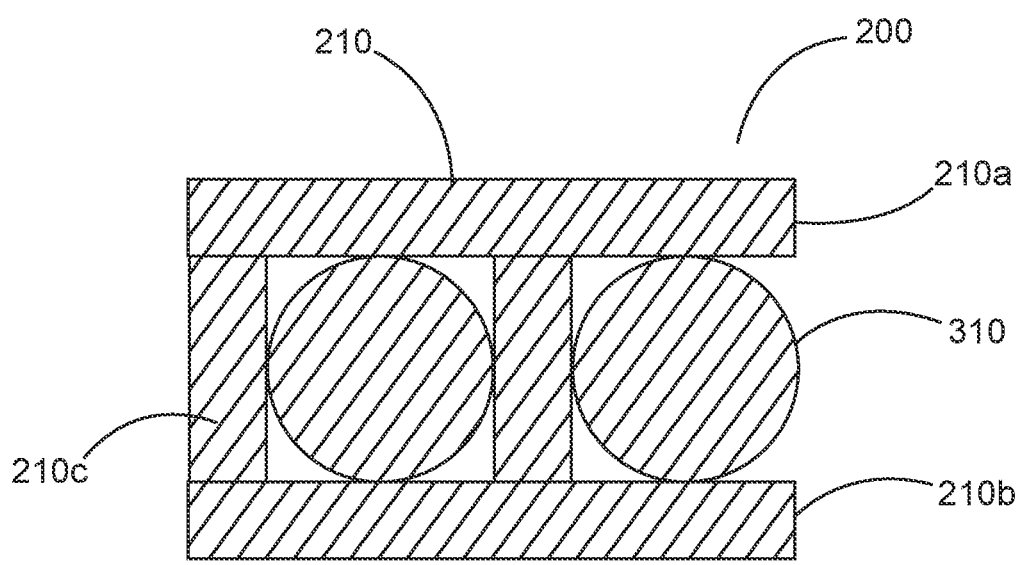
FIG. 4 shows a schematic sectional view of a rotor blade part in the area of the separation point.

FIG. 4 shows a schematic sectional view of a rotor blade part in the area of the interface. According to the exemplary embodiment on FIG. 4, the material of the rotor blade part need not be drilled. Rather, the inserts 310 and 320 can also be processed while manufacturing the rotor blade 200. The point here is to provide recesses for the inserts. An inner laminate 210b, an outer laminate 210a as well as several webs 210c can be provided for this purpose. The inserts can then be provided between the inner and outer laminate 210b, 210a, as well as between the respective webs 210c.

Figure 5:
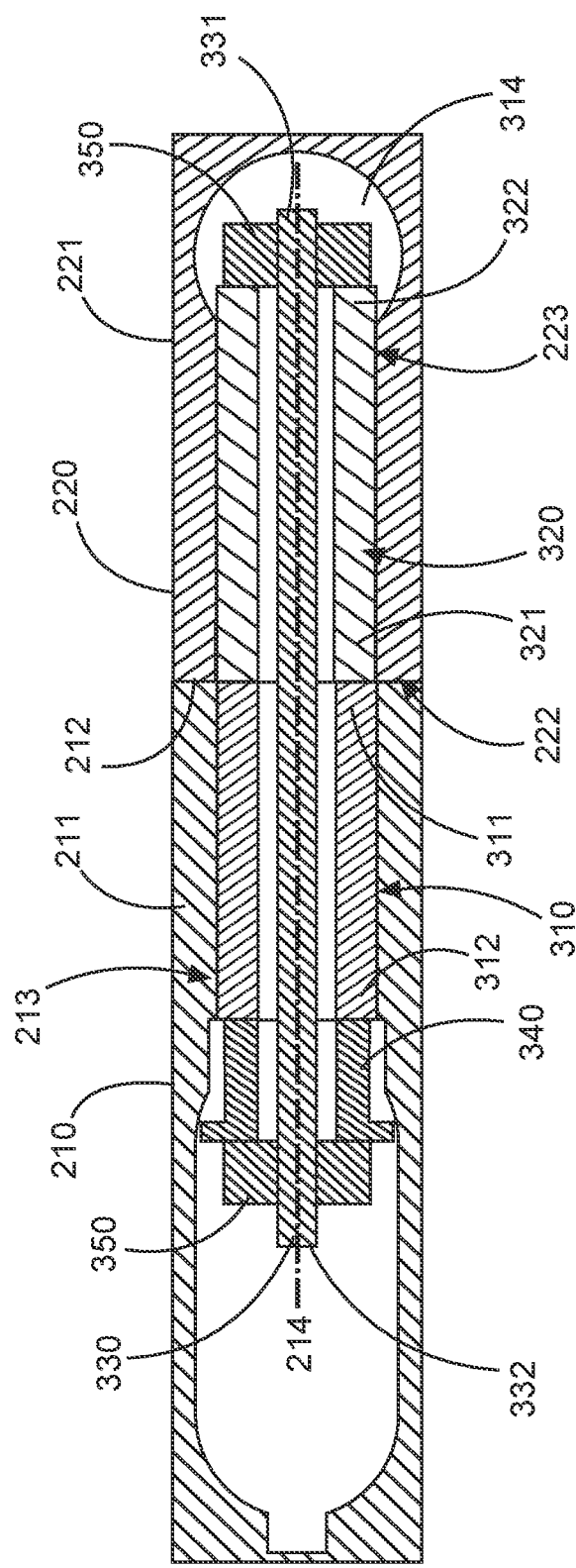
FIG. 5 shows a schematic sectional view of a wind turbine rotor blade in the area of the separation point.

FIG. 5 shows a schematic sectional view of a separation point of a wind turbine rotor blade. A first and second rotor blade section 210, 220 is provided in the area of the separation point 200a. The first and second rotor blade section 210, 220 each have a first and a second front side 212, 222, which abut against each other in the area of the separation point 200a. First and second recesses 213, 223 are provided in the area of the first and second front sides 212, 222. The first and second inserts 310, 320 are placed in these first and second recesses 213, 223. These inserts 310, 320 are preferably made out of metal. The first and second inserts 310, 320 together with a clamping unit 330 form a fastening unit 300 for fastening the first and second rotor blade sections 210, 220 to each other in the area of the separation point 200a. The first and second rotor blade sections 210, 220 have at least one first or second recess (e.g., an oblong hole) 214, 314. The first or second oblong holes or recesses 214, 314 serve to fasten a number of nuts 350 on a clamping unit 330, for example in the form of a threaded rod, so as to thereby fasten the first and second inserts 310, 320 against or with each other.

While only a first oblong hole 214 is provided in the area of the first rotor blade section 210 in the exemplary embodiment on FIG. 2, a second oblong hole/recess 314 is additionally thereto provided in the area of the second rotor blade section 220 in the exemplary embodiment on FIG. 5. The first and second oblong holes/recesses 214, 314 can be used to screw the nuts 350.

Figure 6:
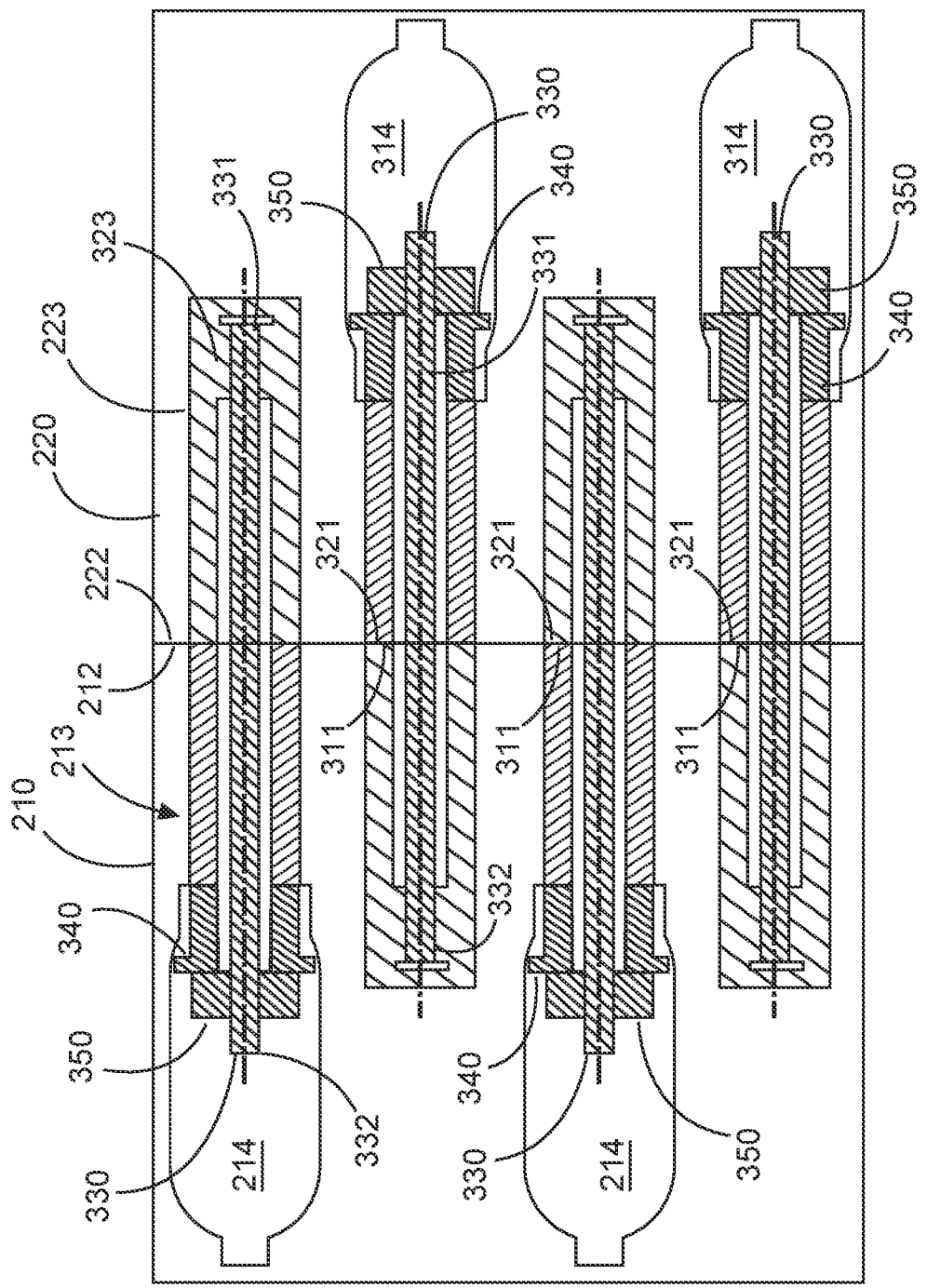
FIG. 6 shows a schematic sectional view of a wind turbine rotor blade in the area of a separation point.

FIG. 6 shows a schematic, sectional view of a separation point of a wind turbine rotor blade. While the exemplary embodiment on FIG. 2 only provides an oblong hole in the first rotor blade section 210, and the exemplary embodiment on FIG. 5 provides first and second oblong holes/recesses 214, 314 in both the first and the second rotor blade section 210, 220, the oblong holes/recesses 214, 314 in the exemplary embodiment on FIG. 6 are alternatingly arranged (in the circumferential direction) in the first and second rotor blade sections 210, 220. Use can here be made of the arrangement from FIGS. 2 and 3 with a nut 350 and thread 323, or of the arrangement from FIG. 5 with nuts at both ends of the clamping unit 330. Alternatively, combinations of the arrangements from FIG. 2 or 3 and FIG. 5 can be used.

REFERENCE LIST

100 Wind turbine
102 Tower
104 Nacelle
106 Rotor
110 Spinner
200 Rotor blade
200a Rotor blade separation point
210 First rotor blade section
210a Outer laminate 210
210b Inner laminate 210
211 First laminate
212 First front side
213 First recess
214 First oblong hole
220 Second rotor blade section
221 Second laminate
222 Second front side
223 Second recess
300 Fastening unit
310 First insert
311 First end 310
312 Second end 310
314 Second oblong holes
320 Second insert
321 First end 320
322 Second end 320
323 Thread
324 Third recess
330 Bolt/rod
331 First end of bolt
332 Second end of bolt
340 Adapter
350 Nut
360 Insert The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wind turbine rotor blade, comprising:
   a longitudinal direction,
   at least one first rotor blade section with a first front side,
   at least one second rotor blade section with a second front side,
   a separation point between the first and second rotor blade sections,
   wherein the first and second front sides abut against each other at the separation point,
   wherein the first front side has a plurality of first recesses, and the second front side has a plurality of second recesses, and
   a fastening unit configured to fasten the first and second rotor blade sections to each other at the separation point,
   wherein the fastening unit has a plurality of first inserts made out of metal and arranged in the first recesses, and a plurality of second inserts made out of metal and arranged in the second recesses,
   wherein each of the plurality of first inserts has a first end and a second end,
   wherein each of the plurality of second inserts has a first end and a second end,
   wherein the first ends of the plurality of first and second inserts are each arranged at the separation point, and
   wherein the fastening unit has a plurality of clamping units, wherein the plurality of clamping units are configured to brace the first and second inserts against each other, wherein the respective first ends of the first and second inserts abut against each another or surround each other and are braced against each other in a braced state.

2. The wind turbine rotor blade according to claim 1, wherein:
   the plurality of clamping units are bolts or threaded rods,
   first ends of the plurality of clamping units are each fastened in or on the second insert, and
   second ends of the plurality of clamping units are each fastened in the first insert.

3. The wind turbine rotor blade according to claim 2, wherein an adapter is arranged between the second ends of the plurality of clamping units and the first insert.

4. The wind turbine rotor blade according to claim 2, wherein the second ends of the plurality of clamping units are each fastened in or on the first insert by a nut, and a pretensioning is provided between the first ends of the first and second inserts by the nut.

5. The wind turbine rotor blade according to claim 1, wherein:
   the first rotor blade section has a plurality of oblong holes, and
   the second ends of the plurality of clamping units extend at least partially into the oblong holes.

6. The wind turbine rotor blade according to claim 1, wherein the first and second rotor blade sections have a plurality of oblong holes or recesses, wherein the first and second ends of the plurality of clamping units extend at least partially into the oblong holes.

7. The wind turbine rotor blade according to claim 6, wherein the oblong holes are alternatingly provided in a circumferential direction in the first and second rotor blade sections, wherein the first and second ends of the plurality of clamping units extend at least partially into the oblong holes.

8. A wind turbine comprising at least one wind turbine rotor blade according to claim 1.

9. A method comprising:
   assembling a wind turbine rotor blade, wherein the wind turbine rotor blade has a first rotor blade section with a first front side, a second rotor blade section with a second front side, and a separation point between the first and second rotor blade sections, wherein the assembling comprises:
   placing a plurality of first inserts made out of metal into a plurality of first recesses in the first front side, and placing a plurality of second inserts made out of metal into a plurality of second recesses in the second front side,
   wherein each of the plurality of first inserts has a respective first and second end, and each of the plurality of second inserts has a respective first and second end, wherein the first ends of the first and second inserts are each arranged on the separation point,
   providing a plurality of clamping units, and
   bracing the plurality of first and second inserts against each other,
   wherein the respective first ends of the plurality of first and second inserts abut against each other and are braced against each other in a braced state.

* * * * *